United States Patent
Morgan

[15] 3,667,128
[45] June 6, 1972

[54] METHOD AND APPARATUS FOR CONNECTING PIPELINES

[72] Inventor: William A. Morgan, Houston, Tex.
[73] Assignee: Brown & Root, Inc., Houston, Tex.
[22] Filed: June 23, 1969
[21] Appl. No.: 835,647

[52] U.S. Cl..............................33/180 R, 33/174 N, 29/407, 269/37
[51] Int. Cl. .........................................................G01b 3/38
[58] Field of Search.................33/174 N, 180 R; 29/407; 269/37

[56] References Cited

UNITED STATES PATENTS

| | | |
|---|---|---|
| 3,270,426 | 9/1966 | Fischer et al.....................33/174 N X |
| 2,431,100 | 11/1947 | Woods................................33/174 N |
| 2,563,599 | 8/1951 | Gardner.............................33/174 N |
| 3,140,534 | 7/1964 | Messina.............................33/174 N |

Primary Examiner—William D. Martin, Jr.
Attorney—Burns, Doane, Swecker & Mathis

[57] ABSTRACT

A method and apparatus for determining the spatial relationship between a pair of adjacent but separated conduit ends, re-establishing the spatial relationship thus determined at a remote environment, fashioning a conduit connecting segment at the remote environment and connecting the conduit thus fabricated to the spaced conduit ends.

17 Claims, 13 Drawing Figures

PATENTED JUN 6 1972

INVENTOR
WILLIAM A. MORGAN

BY *Burns, Doane, Benedict, Swecker & Mathis*

ATTORNEYS

INVENTOR
WILLIAM A. MORGAN

BY Burns, Doane, Benedict, Swecker & Mathis

ATTORNEYS

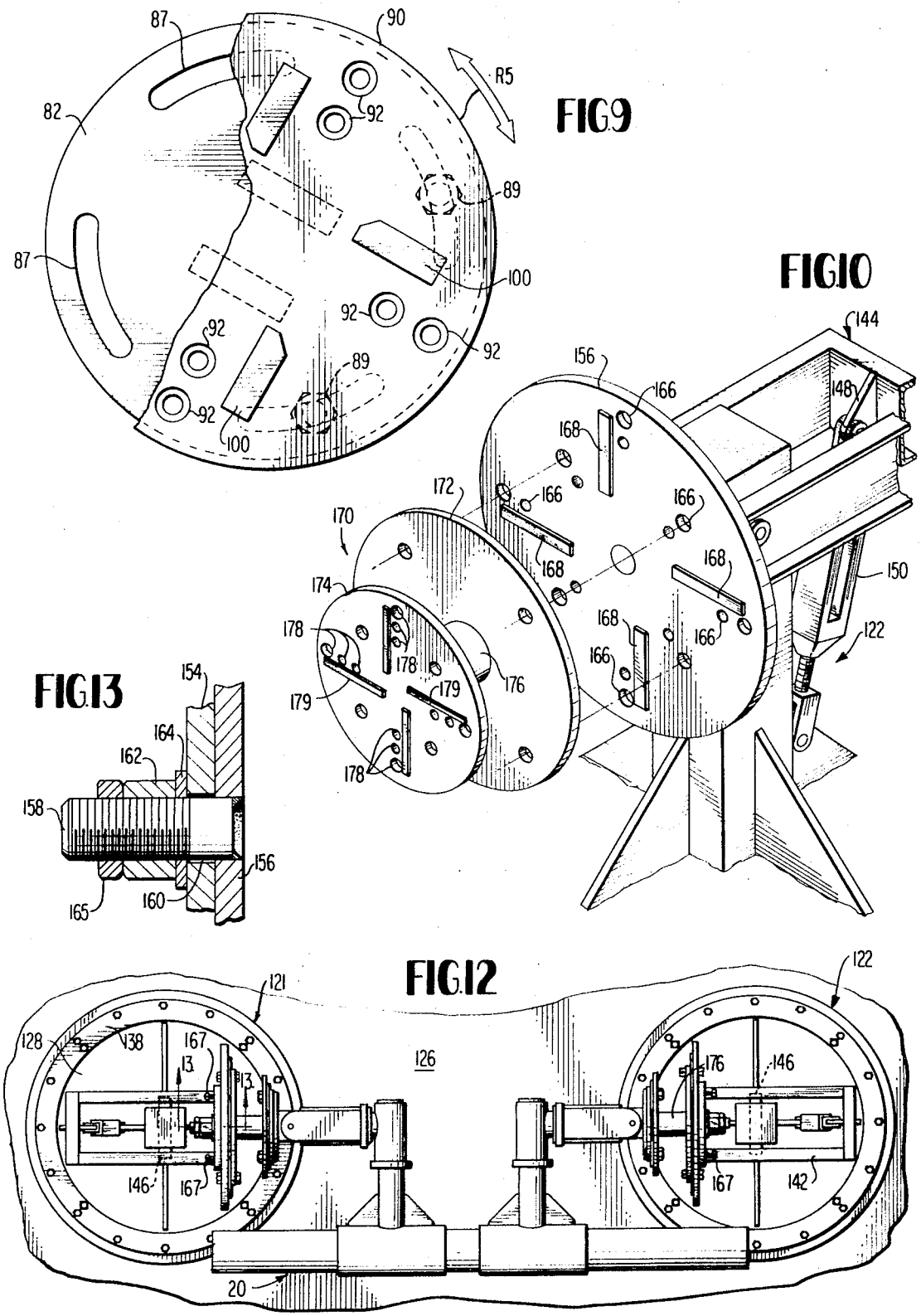

METHOD AND APPARATUS FOR CONNECTING PIPELINES

BACKGROUND OF THE INVENTION

This invention relates to establishing connecting communication between a pair of adjacent but separated conduit ends located in an underwater or otherwise adverse working environment.

Oil from a producing offshore well is frequently transported through a pipeline laying on the ocean floor and extending from the well platform head to the shore or to a collecting station. When such a pipeline is constructed or repaired, problems may develop in attempting to fabricate a pipe length properly shaped to connect the pipeline and a terminus, such as for example, to the lower end of a riser pipe at a well platform, or to the pipeline stub at a collecting station. Because of the nature of offshore pipelaying activities, the pipeline and riser ends may not be positioned in precise longitudinal alignment, and the planes of the pipe ends or flanges may not be parallel. Even if in alignment, the relative distance between the two conduit ends is unpredictable. It is important that the exact relative position of these two ends or flanges be determined in order to fabricate a tight fitting connection. It will readily be appreciated that any leaks in this connection would not only result in a loss of oil but could cause a highly undesirable contamination of the sea water.

In the past, it has sometimes been the practice for a deep sea diver to descend and examine the relative positions of the undersea pipe ends. The diver then surfaced and a connector was fabricated in accordance with the diver's estimate of the required shape. The diver then descended with this fabricated connector and attempted to put it in place. Since it was difficult in many instances to estimate the relative position of the undersea pipe ends with the necessary accuracy, the connector often did not fit and therefore was brought to the surface for modification in accordance with the diver's instructions.

Trial and error techniques of this nature are time consuming and expensive.

At least one other previously known method of connecting two pipe ends comprises lowering a measuring gauge into the ocean to record the spatial relationship between the pipe ends and then raising the gauge to a lay barge or the like to fabricate a suitable pipe segment from the gauge. This known gauge, however, relies on an undesirable ball joint for manipulating the gauge into registering with the pipe ends. This form of connection is relatively easily misaligned. Further, in this gauge the overall manipulating character of the flange engaging plates was limited.

Although the prior methods and apparatus of connecting undersea pipelines are satisfactory in certain respects, a distinct need exists for a more reliable, versatile arrangement for making connections between spaced, submerged conduit ends.

OBJECTS OF THE INVENTION

To this end and other ends it is a general object of the invention to minimize or obviate disadvantages of the type previously discussed.

It is a particular object of the invention to provide a method and apparatus for accurately determining the spatial relationship between the end flanges on adjacent but separate conduits.

It is an object of the invention to provide a method and apparatus for connecting the end flanges on adjacent but separated portions of conduits in an adverse working environment.

It is another object of the invention to provide a method and apparatus for easily disconnecting the gauge from the spaced conduits once their spatial relationship has been accurately recorded.

It is still another object of the invention to provide a novel method and apparatus for reproducing the spatial relationship of the conduits at a desirable work environment.

It is a further object of the invention to provide a gauge which will be easy to manipulate in the sea, therefore requiring a minimum number of divers.

It is still a further object of the invention to provide a gauge that will readily adapt to a large variety of pipeline sizes, be rugged in construction, and permit engagement with the ends of pipelines which may be widely misaligned with respect to each other.

A method of accomplishing at least some of these foregoing objects comprises accurately recording the spatial relationship between the end flanges on adjacent but separated portions of conduits positioned in an adverse working environment, transferring the spatial recording to a desirable work location, accurately reconstructing the spatial relationship between the ends of a pair of jig fixtures, fabricating a suitable conduit between the fixtures and transporting the conduit section thus fabricated to the adverse environment for installation between the spaced conduit ends.

The step of recording may be accomplished by a flange gauge utilizing a pair of flange plates which may be removably connected to the spaced conduit ends. Each flange plate is connected by a linkage to a support bar. Each such linkage provides three mutually perpendicular axes of rotation. Each flange plate is rotatable about its longitudinal axis, independent of the linkage. The linkages permit adjustment of the gauge plates in laterally displaced locations.

The steps of reconstructing the spatial relationship of the conduit ends may be accomplished by a pair of separate jig fixtures, each having at least three mutually perpendicular adjustment axes.

THE DRAWINGS

Other significant objects and aspects of the invention will become apparent from the following detailed description taken in conjunction with the accompanying drawings wherein:

FIG. 8 is a cross sectional view of one of the linkage arms of FIG. 6 taken along section line 8—8 of FIG. 7;

FIG. 9 is an end view, partially in section, of a flange adapter as shown in FIG. 6;

FIG. 10 is an isometric view of a jig template and flange joint adapter forming a part of the invention;

FIG. 12 is a top plan view of a pair of jig templates as shown in FIGS. 10 and 11, placed in registry with a pair of flange adapters and a gauge as shown in FIG. 6; and FIG. 13 is a partial cross sectional view taken along section line 13—13 of FIG. 12, showing the detail of the jig end plate rotational adjustment mechanism.

DESCRIPTION OF THE PREFERRED EMBODIMENTS

Figure 1:
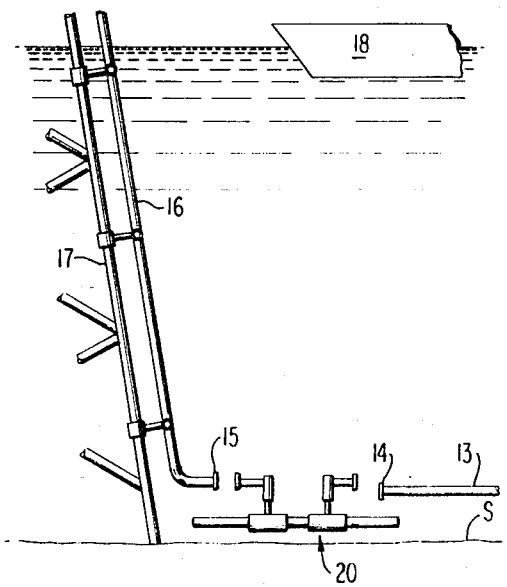
FIG. 1 is a schematic view showing the beginning of a sequential series of steps in connecting the spaced ends of two conduits which are located in an adverse environment, and particularly shows a flange gauge prior to registry with the spaced conduit flange ends of a pipeline and riser.

Referring now to the drawings wherein like numerals designate like parts and more specifically to FIGS. 1–5, there is depicted in sequence a method and apparatus for connecting the spatially disoriented ends of a pipeline in an adverse working environment, such as under the sea.

Referring to FIG. 1, a pipeline conduit 13 is shown with an end flange 14 spatially separated from the end flange 15 of a riser pipe 16. The riser 16 is conventionally connected to one leg of a support tower 17. For the reasons previously discussed, it would be desirable to know the spatial relationship between the spaced flanges 14 and 15, so that a conduit exactly spanning the spaced pipe ends may be lowered and coupled into place. To this end a gauge 20 has been lowered from a lay barge 18 by a suitable means, such as, for example, by a winch or crane assembly.

Figure 2:
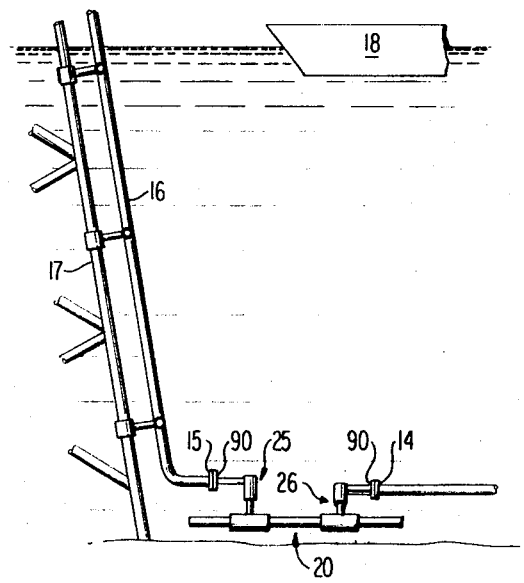
FIG. 2 is a schematic view showing a flange gauge in registry with the spaced conduit ends.

In FIG. 2, as will be more fully discussed hereinafter, universally rotatable linkages 25 and 26 have been manipulated to bring the gauge 20, carrying flange adapter plates 90, into intimate engagement with the pipeline and riser end flanges 14 and 15 respectively.

For ease of illustration, pipeline flange 14 and riser flange 15 are illustrated somewhat above submerged surfaces. Ordinarily, at least flange 14 would be substantially adjacent this surface. Thus, in many instances, gauge 20 would be manipulated in a position or orientation different from that shown in FIGS. 1 and 2.

Figure 3:
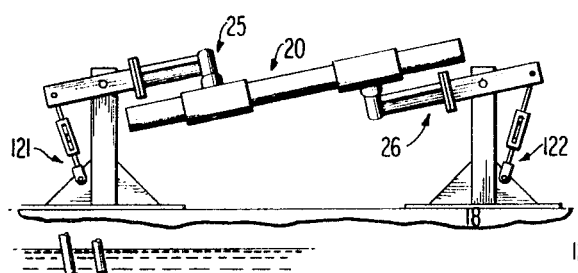
FIG. 3 is a schematic view showing the flange templates transported to a desirable work location on a floating vessel and positioned between a pair of jig templates, thus reestablishing the end conduits spatial relationship in a suitable working environment.

The gauge and adapter plates may then be raised to the deck of the barge 18, as best seen in FIG. 3, where the exact spatial relationship of the underwater pipe ends may be re-established between a pair of template fixtures 121 and 122.

Figure 4:
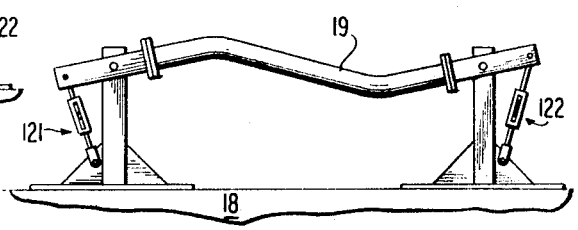
FIG. 4 is a schematic view showing a pipe section fabricated between the fabrication templates or fixtures.
Figure 5:
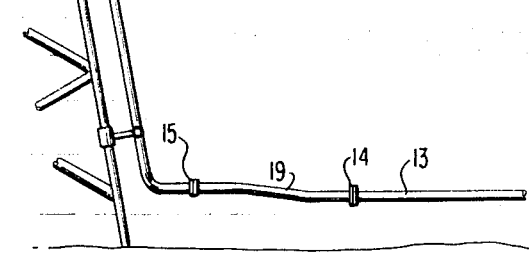
FIG. 5 is a schematic view showing the fabricated pipe section installed into place between the spaced conduit ends.

A pipe section 19, as seen in FIG. 4, may then be fabricated by conventional means between the spatially established templates. Once fabricated, the pipe may then be lowered into the adverse environment and installed, as shown in FIG. 5, between the spaced pipe ends with an exact non-stressed fit.

Pipe Flange Gauge

Figure 6:
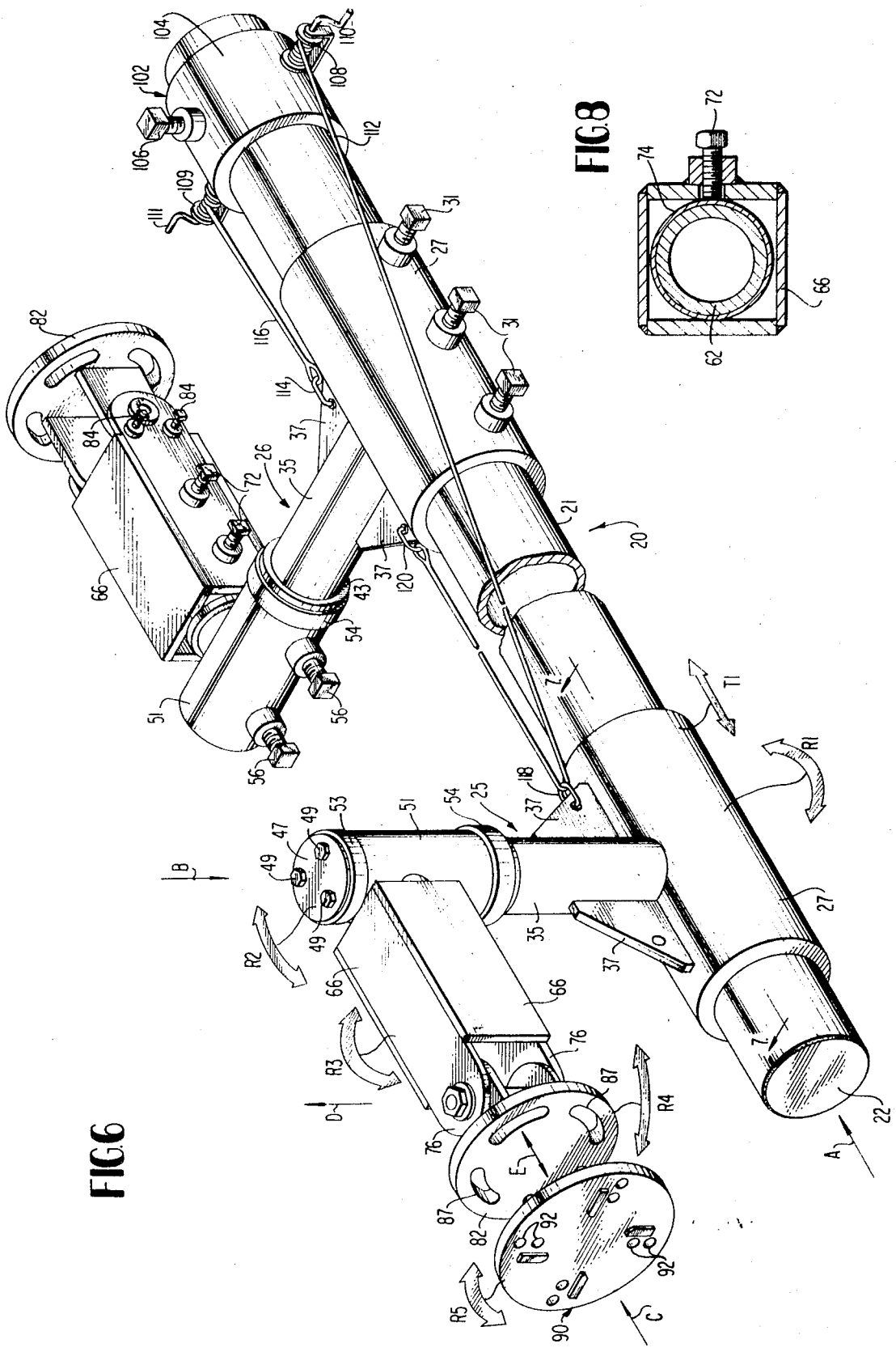
FIG. 6 is an isometric view of a flange gauge having a tubular support bar and a pair of flange registering mechanical linkages, each having three mutually perpendicular axes of rotation utilized in conjunction with a flange adapter mounting which provides two further axes of rotation.

With reference specifically to FIG. 6, a pipeline gauge constituting a preferred form of one aspect of the invention is shown.

The gauge 20 is composed of a first tubular support bar 21 having end caps 22 sealingly welded at each end thereto by a weldment 23. The support bar is therefore generally hollow and impervious to entry by external fluids and may therefore be somewhat buoyant when placed in the sea.

Figure 7:
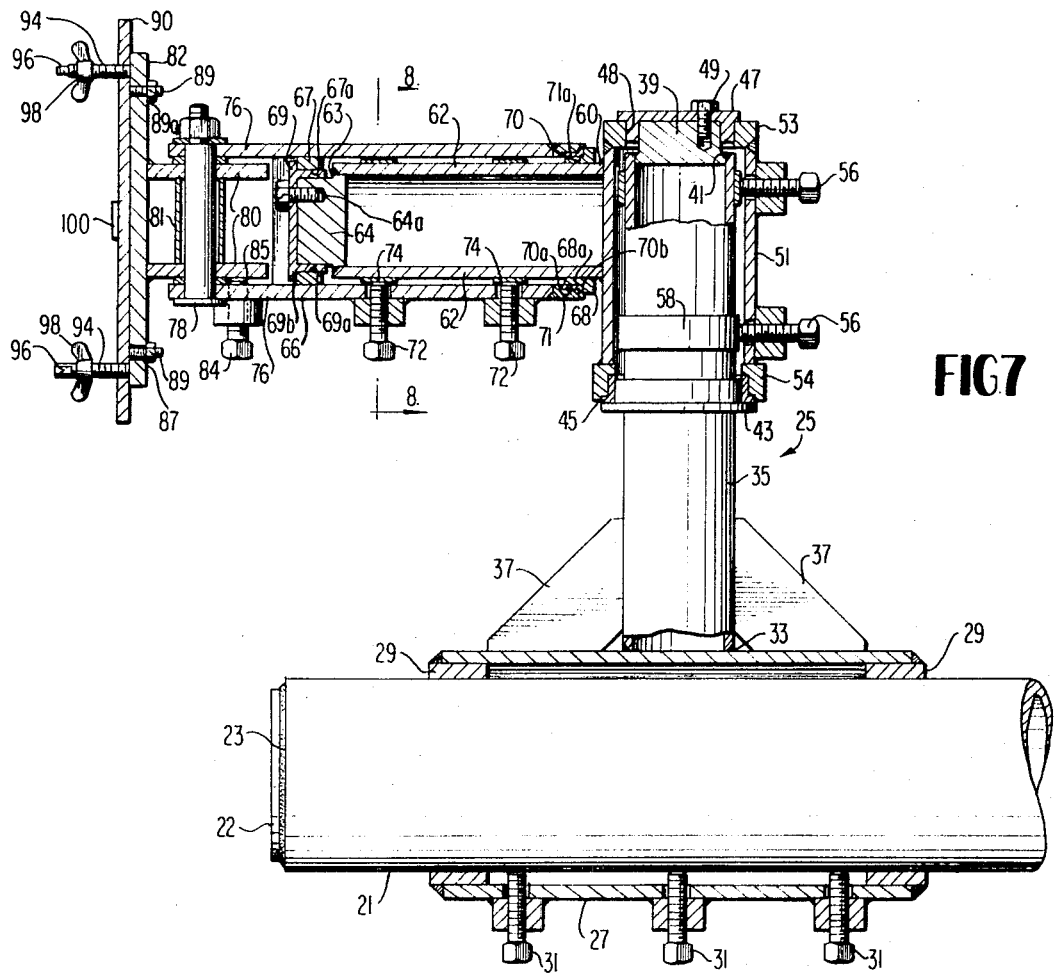
FIG. 7 is a side elevational, partially sectioned view of one end of the flange template shown in FIG. 1, taken along section line 7—7 of FIG. 6.

Positioned at approximately each end of the support bar 21 are a pair of universally rotatable flange engaging linkages 25 and 26 which are identical in construction, and therefore, interchangeable. The linkage comprises a first collar 27 for rotation about and translation on the support bar, as depicted in FIG. 6 by arrows R1 and T1. The first collar 27 may be spaced from the support bar 21 by bearing rings 29 as best seen in FIG. 7. The collar may be adjustably locked to the support bar by a plurality of lock screws 31 carried by collar 27 and engageable with bar 21.

Normally extending and sealingly welded, as at 33 to the first collar 27, is an upstanding tubular leg 35. The leg 35 is supported on opposite sides thereof by generally triangular shaped gussets 37. The free end of the tubular leg 35 is provided with a cap 39 sealingly welded thereto as at 41.

The tubular leg 35 is provided with a lower bearing race 43 and bearing sleeve 45. The cap 39 is also provided with a retaining and bearing plate 47 which may be secured by a plurality of machine bolts 49. Cap 47 provides an annular bearing face 48 of L-shaped cross section.

Positioned between the bearings 45 and 47 is a second collar 51. The collar 51 is provided with an upper and lower bearing ring 53 and 54 respectively, for contiguous rotational engagement with bearings 47 and 45 respectively, for accurately aligned rotation about the axis of leg 35. The collar 51 may be rotationally locked by the positive application of a pair of locking set screws 56 carried by collar 51 and which engage wall rings 58 which are fixedly attached to the tubular leg 35.

Extending normally to the second collar 51 and sealingly welded thereto as at 60, is a second tubular leg 62 which is provided at its free end with an end cap 64 which may be sealingly welded thereto as at 63. Thus, for reasons as previously discussed, the first tubular leg as well as the second tubular leg 62 are both generally hollow sealed cylinders, which may be fabricated of aluminum to enable the gauge to be somewhat buoyant and therefore more easily manipulated by divers in the sea.

Bearing seat 67 is mounted on the interior of rectangularly cross sectioned collar 66 and provides a cylindrical bearing edge 67a. Bearing edge 67a engages a cylindrical bearing face 69a provided by a retainer bearing plate 69. Plate 69 is secured to cap 64 by threaded fasteners 64a.

Bearing seat 68 is mounted on leg 62 and provides a cylindrical bearing face 68a. Face 68a engages a cylindrical bearing face 70a provided by a bearing 70. Bearing 70 is mounted on a plate 71 having a rectangular periphery conforming to the periphery of collar 66 and a circular seat 71a within which bearing 70 is mounted.

Bearing edges 70b and 69b axially engage seat 68 and seat 67, respectively, to prevent or limit axial movement of collar 66 on leg 62.

The above-described bearings serve to longitudinally limit but rotationally permit accurate movement of the third collar 66, with respect to the second tubular leg 62. The third collar 66 may be rotationally locked with respect to the second leg by the positive application of set screws 72 carried by collar 66 and which act against cylindrical bearing sleeves 74 welded to the outer surface of the second tubular leg 62.

The third collar 66 is further provided with a bifurcated pin bracket 76 which retains a threaded and shouldered pivot pin 78. Pin 78 rotatably supports a set of bracket bars 80 which in turn support an adjustment plate 82. Bracket bars 80 are interconnected by a sleeve 81, as shown in FIG. 7.

As best seen in FIGS. 6 and 7, the adjustment plate 82 may be rotated about the axis of the pin 78 and locked in a desired position by the impingement of a machine screw 84 on one of the bracket bars 80, as at 85. The adjustment plate 82 may be provided with a plurality of circumferentially extending slots 87 in each quadrant of the adjustment plate for the reception of locking studs 89 carried by a flange adapter plate 90. With the nuts 89a of studs 89 loosened, plate 90 may be rotated about the longitudinal central axis of plate 82 to the extent permitted by the travel of studs 89 through slots 87. By tightening nuts 89a plates 82 and 90 are locked together.

The adapter plate 90, as best seen in FIG. 9, may be provided with a plurality of radially and circumferentially spaced holes 92 for alignment with the apertures in the flanges of conduits of various sizes. A plurality of studs 94 may be extended through the pipeline flange and be threadably attached to the holes 92 in the flange adapter plate. The studs 94, as best seen in FIG. 7, may be provided with wrench flats 96 to facilitate the connection process. Each stud may be further provided with a threaded fastener such as a wing nut 98 to releasably attach the adapter 90 to the pipeline flange. The adapter is further provided with a plurality of spacer pads 100 which may serve to occupy the volume at the end of the pipe flange normally allocated to a flange seal.

Referring again to FIG. 6, the second flange engaging linkage 26 may be positioned with respect to the first linkage 25 by means of a winch 102 which comprises a collar 104. This collar is fixedly but adjustably attached by a machine screw 106 to one end of the support bar 21. A pair of winch spools 108 and 109 may be rotatably operated by handles 110 and 111. A first cable 112 extends from winch spool 108 to a shackle 118. This shackle is attached to a gusset 37 of flange engaging linkage 25. Cable 112 passes slidably through shackle 118 and back to fixed engagement with a shackle 120 attached to an opposite gusset 37 of the second flange engaging linkage 26. A second cable 116 extends from the winch spool 109 to a second flange engaging linkage 26 and is attached thereto by a shackle 114. Therefore, when the first flange engaging linkage 25 is fixedly locked to the support bar 21 by setting the lock screws 31, "taking-up" and "letting-out" the spools 108 and 109 may be employed to axially position the second flange engaging linkage 26 with respect to the first linkage 25.

Template Jigs

The above-described gauge 20 is suitable for accurately determining the spatial relationship of the flanged ends of separated but adjacent conduits. The relationship thus registered, the flanged end positions may be reconstructed at a suitable fabrication site by means of a pair of spaced, identical template fixtures 121 and 122 as best seen in FIG. 10.

Figure 11:
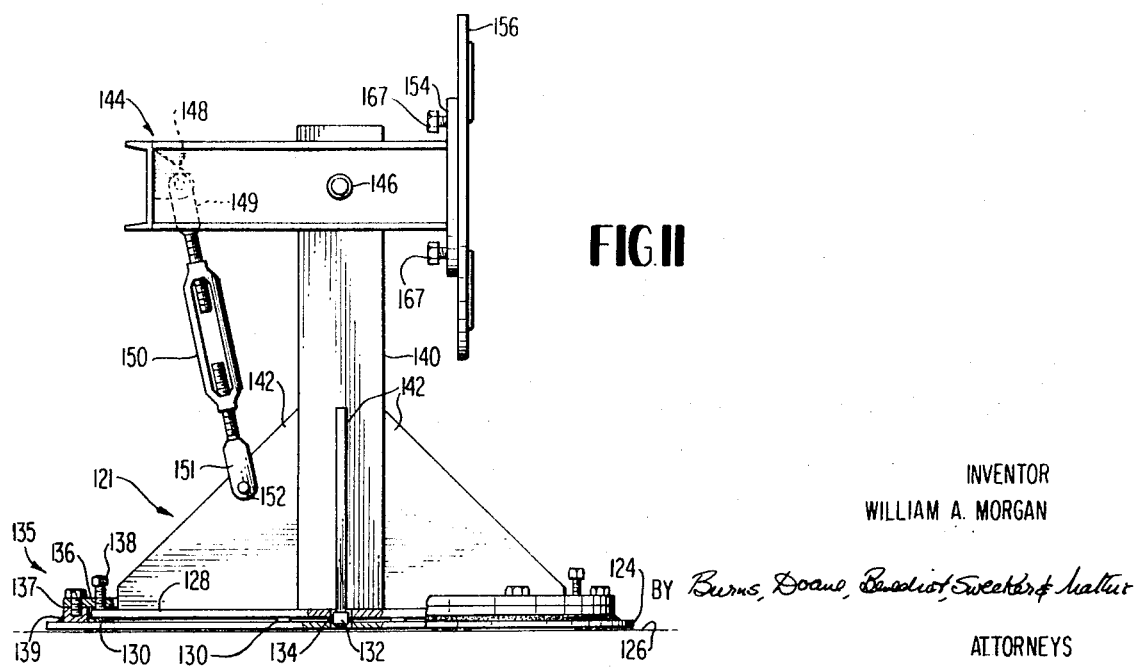
FIG. 11 is a side elevational view of a jig template partially sectioned to disclose the base disc adjustment detail.

With particular reference to FIGS. 11 and 12, identical template fixtures are disclosed. Each fixture is supported upon a base plate 124 which may be tack welded to a lay barge deck as at 126. The jig itself is provided with a base disc 128 which is generally supported parallel to the base plate by a plurality of bearing pads, such as 130. The base disc 128 is further provided for rotation about a central stud 132 which is received within a circular recess 134 in base plate 124. The edges of the disc 128 are received under the lip of a circular L-flange 135 formed from a rim 136 and spacer 137 bolted together. The spacer 137 may be welded to the base plate 124 as at 139. A plurality of machine screws 138 extend through the L-flange and bear against the base disc to lock the base disc in a desired position.

The disc 128 is further provided with a perpendicular, upstanding support 140 which may be supported by a plurality of gussets 142.

A U-shaped horizontal support 144 may be journaled for rotation by a pin connection 146 at the upper end of the upstanding support 140. The closed end of the U-shaped support 144 is provided with an internally extending tab 148 for the rotational reception of the bifurcated end 149 of a take-up, turnbuckle 150. The opposite bifurcated end 151 of the turnbuckle is journaled as at 152, to a gusset 142 which is attached to the base disc 128.

The open end of the U-shaped support 144 may be fixedly attached to a flange-carrying plate 154 as best seen in FIGS. 10 through 12. As shown in FIG. 13, a flange simulator disc 156 may be rotationally attached to the plate 154 by a central stud 158 which is welded to the simulator disc 156 and extends through an aperture 160 in the plate 154. The simulator disc 156 may be rotationally held with respect to the plate 154 by a thrust washer 164 and positive take-up of a conventional, threaded fastener 162 and a lock nut 165. Rotation of the simulator disc 156 with respect to the plate 154 may be fixed by the positive application of set screws 167 extending through the plate 154 and engaging the disc 156.

The disc simulator 156 as best seen in FIG. 10 may be provided with a plurality of radially and peripherally spaced openings 166 to enable the simulator to represent a variety of flange dimensions. A plurality of spacer strips 168 may be attached to the simulator face to represent the space occupied by a flange seal.

While the above described flange simulator disc may be suitable to represent a variety of flange sizes the universal adaptability of the simulator disc may be further extended by the provision of a flange adapter 170. This adapter comprises a first plate 172 provided with mounting holes for registry with holes 166 in the simulator disc 156. A spaced simulator plate 174 is fixedly held to the first plate by an extension sleeve 176. The simulator plate, like the simulator disc, may be provided with a plurality of radially and circumferentially spaced apertures 178 and seal compensation strips 179 to enable the simulator plates to imitate a variety of flange dimensions. The flange adapter 170, as depicted in FIG. 10, is shown as a reducer plate, so as to provide a mounting for flanges and gauges too small to be secured to plate 156 due to the interfering presence of the structure which supports plate 156.

Pipe Connecting Operation

In order to connect the spaced ends of separate but adjacent conduits, resting in an adverse environment such as beneath the sea, a gauge 20 may be first lowered into proximity with the pipe ends. As previously discussed, the support bar 21 and first and second arms 35 and 62 of the universal linkages 25 and 26 are all buoyant. Therefore, the gauge which may be relatively heavy while on the lay barge may be quite mobile and manipulatable in the water by one or two divers.

In recording the spatial relationship of the spaced flange ends 14 and 15, the gauge 20 carrying flange adapter plates 90 is manipulated into position so that the adapter plates may be securely fastened to the pipe end flanges 14 and 15 by removable studs 94 and threaded fasteners 98.

A diver first sets the first collar 27 of the linkage 25 with respect to the support bar 21 by tightening the set screws 31. The rest of the locking set screws are backed off so that the second arm 62, third collar 66 and adjustment plate 82 may all freely rotate about their axes. The lock screws of the second flange engaging linkage 26 are all backed off so that the first collar of the second linkage may be freely rotatable about and translatable on the support bar 21.

With the first collar 27 of the first mechanical linkage 25 axially and rotatably locked with respect to the support bar 21, the winch spools 108 and 109 may be let out or taken-up to slidably translate the second mechanical linkage 26 to a posture whereby the freely rotatable adjustment collars may be manipulated to bring plates 90 into general registry with the flange of the adjacent conduit ends. The peripheral slots 87 in the adjustment plates 82 admit to the reception of the fasteners 89 in a plurality of peripheral postures, with the resulting effect that a degree of rotational freedom is provided between the adjustment plates 82 and the flange adapter plates 90. This enables the studs 94 to be aligned with flange holes of the conduit flanges to which the plates 90 are coupled. Threaded fasteners 98 may then be installed to lock plates 90 to the conduit flanges.

Subsequent to the locking of the adjustment plates to the flange adapters 90, the rest of the locking screws 31, 56, 72 and 84 may be tightened to rigidly set the gauge in the fixed spatial relationship of the spaced pipe ends.

The threaded fasteners 98 may then be backed off of studs 94 and the studs may be removed from the flange adapter plates 90. With the removal of the adapter plate studs, the gauge 20 may be easily manipulated out of engagement with the pipeline flanges 14 and 15.

The gauge may then be transported to a pipelaying barge 18 where the conduit flange, spatial relationship may be re-established. In this regard, a pair of universally rotatable jig fixtures 121 and 122 may be positioned adjacent the ends of the gauge 20. The base lock screws 138 and the plate set screws 167 on each of the jigs may be backed off to enable the simulator discs 156 to be aligned with the now replaced studs 94 in the flange adapter plates 90. The base plates 128 of each template jig may be rotated about its axis, the take-up turnbuckles 150 may be manipulated to oscillate the simulator disc, and the simulator disc may be axially rotated until a set of holes on the disc are brought into alignment with the replaced studs 94 in the flange adapter plates 90. The threaded fasteners 98 are applied to securely attach the flange adapter plates 90 to the simulator discs 156. As shown in FIG. 10, a flange adapter may be positioned on the simulator disc 156 prior to connection with the flange adapter plates 90. It should be readily recognized that the inclusion or removal of the flange adapter 170 will be dictated by the relative pipeline diameter being fabricated.

With the gauge 20 thus positioned, the lock screws 138 and set screws 167 may be securely tightened and the jigs anchored as by welding to a fixed surface. The fasteners 98 and studs 94 may then be removed, thus allowing the gauge 20 to be removed from the template jigs.

A standard pipe flange may then be bolted to the simulator disc or plate on each jig and a pipe section then constructed between the two end flanges. Once constructed, the conduit section may be removed and transported back to the adverse working environment and connected with the ends of the spaced conduit flanges 14 and 15.

In order to maintain the proper orientation of the bolt holes of the section flanges, a suitable indicia for the uppermost holes at each flange end may be used so that the divers may readily attach the fabricated conduit section with the proper orientation.

While the adapter plates 90 are preferably connected to and carried by the gauge 20 at all times it is within the purview of the invention to first connect plates 90 separated from the gauge 20 to the flange ends and then connect the gauge 20 to these plates.

Degrees of Gauge Movement

Each of the gauge assemblies 25 and 26 permits movement of its plate 90 with unique versatility due to the provision of several uniquely interrelated but spatially separated rotation axes.

This degree of adjustability will be described with reference to FIG. 6.

For example, in connection with assembly 25, the plates 82 and 90 are supported by a linkage arrangement defined by legs 35 and 62 and the collars 27, 51 and 66 so as to permit the plates 82 and 90 to rotate about three mutually distinct rotation axes.

The first of these axes A extends coaxially of the mounting base 21 and rotation of collar 27 is indicated by arrow R1. The second axis B is perpendicular to axis A and extends coaxially of leg 35 and collar 51. Rotation of collar 51 is indicated by arrow R2. The third axis C extends perpendicular to axis B and within a plane parallel to axis A and passes coaxially through leg 62. Rotation of collar 66 is indicated by arrow R3.

This particular linkage arrangement which provides three independent degrees of rotational freedom enables the plates 82 and 90 to universally rotate with respect to the support bar 21.

In addition to this degree of movement, the pin 78 provides an additional axis of rotation D extending perpendicular to axis C, therefore plates 82 and 90 may be rotated as indicated by arrow R4. Axis D, however, is substantially displaced from axis B as shown in FIG. 6.

The slot and stud bolt arrangement interconnecting plates 82 and 90 permits rotation of plate 90 relative to plate 82 about an axis E extending coaxially of these two plates. When the two plates are aligned so as to be oriented perpendicular to axis C, axes C and E are substantially coincident. The rotation of plate 90 with respect to plate 82 is indicated by arrow R5.

Thus, the degree of rotational freedom provided by axes D and E enable the plate 90 to be selectively manipulated when the plate 90 is disposed substantially contiguous with and adjacent the conduit end with which it is to be secured for alignment purposes.

In other words, axes A, B and C enable the plate 90 to be positioned at the general alignment location while axes C, D and E cooperate to permit the plate 90 to be adjusted to a condition of precise alignment with the conduit end.

As will be appreciated, the various degrees of freedom provided by the axes A through E permit articulation of the components of assembly 25 in sequences substantially different from that just described.

The versatility and adjustment of assembly 25 is augmented by the identical adjustability of the assembly 26.

This overall adjustability is facilitated by the mounting of assemblies 25 and 26 on base 21 for selective axial adjustability as indicated by arrow T1.

SUMMARY OF THE ADVANTAGES

It will be appreciated by those skilled in the art that the above disclosures describes a method and apparatus for connecting spaced conduit ends in an adverse working environment. The pipeline gauge is constructed to exhibit a desirable degree of buoyancy for ease of manipulation by a minimum number of divers in an underwater environment. The pipeline gauge is rugged in construction and independent adjustment mechanisms firmly prevent inadvertent slippage. Therefore, the gauge will admit to utilization with large diameter pipes. Manipulation of the gauge may be facilitated with a winch, therefore allowing the gauge to be large and rugged, yet easily handled.

Each gauge end has three mutually perpendicular axes of rotation, each of which may rotate 360° to accommodate a wide range of pipeline eccentricity. In addition, the face of each gauge linkage may be rotated with respect to the arm of the linkage on which it is mounted.

Flange adapter plates may be utilized having a plurality of apertures therein to accommodate a variety of pipeline diameters and each flange adapter plate may be rotatable with respect to the gauge end plates to effectuate another degree of rotational freedom and to facilitate alignment with the holes in the pipeline flanges. The flange adapter plates are provided with removable studs, therefore allowing the gauge to be easily freed from the pipeline once set.

The jig templates are separate and identical, thus interchangeable, and their position on the lay barge may be established in accordance with a wide range of pipeline sizes and eccentricities. The jigs being required to support a heavy and bulky pipeline are provided with rugged independent adjustment mechanisms for rotation about three mutually perpendicular axes to accommodate for end plate eccentricities.

An adapter may be readily connected to the jig fixtures to accommodate a variety of pipeline sizes.

Although the invention is described with reference to preferred embodiments, it will be appreciated by those skilled in the art that additions, deletions, modifications, substitutions and other changes not specifically described and illustrated in these embodiments may be made which will fall within the purview of the appended claims.

What is claimed is:

1. A gauge for accurately determining the spatial relationship between the flanged ends of two separated but adjacent conduits comprising:
   a tubular support bar;
   a first conduit flange adapter means for registering with an end flange on one of the conduits;
   a first mechanical linkage, including
   a first collar surrounding said tubular support bar and being mounted for translation and rotation thereupon;
   locking means engageable with said first collar and said bar for adjustably locking said collar with respect to said bar;
   a first tubular arm extending generally perpendicularly from said first collar;
   a second collar coaxially surrounding for rotation the free end of said first tubular arm;
   locking means engageable for said second collar and said first arm for adjustably locking said second collar with respect to said first arm;
   a second tubular arm extending generally perpendicularly from said second collar;
   a third collar coaxially surrounding for rotation the free end of said second tubular arm and for supporting connection to said first conduit flange adapter means;
   locking means engageable with said third collar and said second arm for adjustably retaining said third collar with respect to said second arm;

a second conduit flange adapter means for registering with a flange on the other of the conduits;

a second mechanical linkage including, a first collar surrounding said tubular support bar and being mounted for translation and rotation thereupon;

locking means engageable with said first collar and said bar for adjustably locking said collar with respect to said bar;

a first tubular arm extending generally perpendicularly from said first collar;

a second collar coaxially surrounding for rotation the free end of said first tubular arm;

locking means engageable with said second collar and said first arm for adjustably locking said second collar with respect to said first arm;

a second tubular arm extending generally perpendicularly from said second collar;

a third collar coaxially surrounding for rotation the free end of said second tubular arm and for supporting connection to said second conduit flange adapter means; and locking means engageable with said third collar and said second arm for adjustably rotating said third collar with respect to said second arm, whereby said first and second flange adapter means may be readily adjusted into register with the flange ends of the separated conduits for accurately determing the spatial relationship therebetween.

2. A gauge as defined in claim 21 wherein:

said tubular support bar is provided with a pair of sealing end plates, one at each end thereof, whereby the support bar when placed in a fluid denser than the fluid inside the support bar may experience a buoyant force.

3. A gauge as defined in claim 1 wherein:

said first and second tubular arms manually extending from said first and second collars respectively are sealingly attached to said collars, and said first and second tubular arms are provided with sealing end plates at the free ends thereof, whereby said first and second arms when placed in a fluid denser than the fluid within their interior may experience a buoyant force.

4. A gauge as defined in claim 3 wherein:

said first and second tubular arms each are provided with first and second axially spaced bearing surfaces for the intimate cooperation with and axial retension of said second and third collar members.

5. A gauge as defined in claim 3 wherein each of said holding means engageable with said first, second and third collars and said tubular support bar, first and second tubular arms respectively comprises:

a plurality of set screws, whereby said collars and the tubular members surrounded thereby may be ruggedly but adjustably held in a desired relationship.

6. A gauge as defined in claim 5 wherein:

said first and second tubular arms are provided with bearing sleeves at each corresponding set screw location, whereby a maximum set screw load may be taken without scarring and damaging said tubular arms.

7. A gauge as defined in claim 1 and further comprising:

winch means mounted on said support bar for positioning said second collar with respect to said first collar.

8. A gauge as defined in claim 7 wherein said winch means comprises:

a winch collar fixedly surrounding one extreme end of said support bar;

a first and second take-up spool normally extending on generally diametrically opposite portions of said collar;

a first cable extending from said first take-up spool to the linkage collar remote from said winch and passing through a shackle thereupon and returning for fixed attachment to the linkage collar adjacent said winch;

a second cable extending from said second take-up spool, and fixedly attached to said linkage collar adjacent said winch, whereby rotation of said winch spools may serve to adjust one linkage with respect to the other.

9. A gauge for accurately determining the spatial relationship between the flanged ends of two separated but adjacent conduits comprising:

a tubular support bar;

a first conduit flange adapter means for registering with an end flange on one of the conduits;

a first mechanical linkage means for adjustably supporting said first flange adapter means for translation and at least 3° of rotational freedom with respect to said support bar, and said linkage means being positioned approximately at one end of said support bar;

a second conduit flange adapter means for registering with a flange on the other of the conduits;

a second mechanical linkage means for adjustably supporting said second flange adapter means for translation and at least three degrees of rotational freedom with respect to said support bar, said linkage means being positioned approximately at the other end of said bar, and a first and second adjustable pivotal coupling means for adjustably connecting said first and second flange adapter means with said first and second linkage means respectively with at least 1° of rotational freedom, whereby said first and second flange adapter means may be readily adjusted into register with the flange ends of the separated conduits for accurately determining the spatial relationship therebetween.

10. A gauge as defined in claim 9 wherein said first and second adjustable pivotal coupling means is provided with:

at least 2° of rotational freedom.

11. A gauge for accurately determining the spatial relationship between the flanged ends of two separated but adjacent conduits comprising:

a tubular support bar;

a first conduit flange adapter including, a generally flat circular plate, having a plurality of holes extending through said plate being both radially and circumferentially spaced to facilitate alignment with the apertures in a variety of conduit flange sizes, a plurality of removable fasteners extending normally from one side of said plate suitable for fastening engagement through a plurality of apertures in a conduit flange when aligned with the holes in said plate, and a plurality of fixed fasteners extending normally from the other side of said plate;

a first mechanical linkage means for adjustably supporting said first conduit flange adapter for translation and at least 3° of rotational freedom with respect to said support bar, and said linkage means being positioned approximately at one end of the support bar;

a second conduit flange adapter including, a generally flat circular plate, having a plurality of holes extending through said plate being both radially and circumferentially spaced to facilitate alignment with the apertures in a variety of conduit flange sizes, a plurality of removable fastenings extending normally from one side of said plate suitable for fastening engagement through a plurality of apertures in a conduit flange when aligned with the holes in said plate, and a plurality of fixed fasteners extending normally from the other side of said plate; and a second mechanical linkage means for adjustably supporting said second conduit flange adapter for translation and at least 3° of rotational freedom with respect to said support bar, said linkage means being positioned approximately at the other end of said bar, whereby said first and second flange adapters may be readily adjusted into register with the flange ends of the separated conduits for accurately determining the spatial relationship therebetween.

12. A gauge as defined in claim 11 and further comprising:

a plurality of radially extending spacer pads fixedly attached to the flat circular plates of said first and second conduit flange adapters for engagement with the conduit flange to dimensionally compensate for the absence of a seal on the flange.

13. A gauge as defined in claim 9 wherein said first and second adjustable pivotal coupling means each comprise:
- a bifurcated extension of the respective ones of said first and second mechanical linkage means;
- a generally flat plate having a plurality of slots therein;
- a pair of tabs normally projecting from said plate;
- a pin for rotatably connecting said bifurcated extension and said tabs, and
- a plurality of screws for adjustably locking at least one arm of said bifurcated extension and at least one of said tabs, whereby said first and second flange adapter means when attached to respective ones of said plates may be pivotally adjusted with respect to said first and second mechanical linkage means.

14. A gauge as defined in claim 13 wherein:
said slots in said flat plate extend around the plate in generally circumferential segments, whereby said first and second flange adapter means may be pivotally connected with respect to respective ones of said plates.

15. A gauge for accurately determining the spatial relationship between the flanged ends of first and second separated but adjacent conduits comprising:
- a tubular support bar having a longitudinal axis;
- a first and second conduit flange adapter means for registering with the end flange of the first and second conduits conduits, respectively;
- a first and second mechanical linkage means for adjustably supporting each of said first and second flange adapter means for translation and at least 2° of rotational freedom with respect to the longitudinal axis of said support bar, said first and second mechanical linkage being positioned approximately on opposite ends of said bar;
- a first and second adjustable pivotal coupling means for adjustably connecting said first and second flange adapter means with said first and second linkage means respectively, with at least 1° of rotational freedom about axes generally parallel with said support bar longitudinal axis, whereby said first and second flange adapter means may be readily adjusted into register with the flange ends of the separated conduits for establishing the spatial relationship therebetween.

16. A method of determining the spatial relationship between the flanged ends of first and second spaced conduits comprising the steps of:
fastening a first and second adapter plate by removable studs to the flanges of the first and second conduit ends, respectively;
adjusting a gauge member between said plates by,
manipulating a first mechanical linkage carried by a support bar having three mutually perpendicular axes of rotation into firm engagement with said first plate, and setting said linkages with respect to their axes of rotation;
manipulating a second mechanical linkage on said bar having three mutually perpendicular axes of rotation into firm engagement with said second plate, and setting said linkages with respect to their axes of rotation;
removing said gauge member from said flanged pipe ends, by
removing said removable studs from said flanges and plates, and
lifting said gauge member from contact with said conduits flanged ends, whereby
said gauge member thus removed accurately represent the spatial relationship between the flanges of said first and second spaced conduits.

17. A method of determining the spatial relationship between the flanged ends of first and second spaced conduits as defined in claim 16 and further comprising the steps of:
setting the base of said first mechanical linkage with respect to said bar prior to manipulation of said first adapter plate into engagement with said first spaced conduit, and
positioning said second mechanical linkage axially along said bar into approximately the final axial position of said second linkage prior to manipulation of said first mechanical linkage and said adapter plate into engagement with said first conduit end, by
pulling said second linkage along said support bar in a first direction by a direct cable connection with one spool of a winch positioned at one extreme end of said bar, adjacent to said second linkage connection, and
pulling said second linkage along said support bar in a reverse direction by a cable passing around said first mechanical linkage and returning to a second spool of said winch.

\* \* \* \* \*